United States Patent Office 3,361,683
Patented Jan. 2, 1968

3,361,683
DEHYDROGENATION CATALYSTS
William R. Gutmann, Louisville, Ky., assignor to Catalysts & Chemicals Inc., Louisville, Ky., a corporation of Delaware
No Drawing. Filed Feb. 3, 1965, Ser. No. 430,210
2 Claims. (Cl. 252—470)

ABSTRACT OF THE DISCLOSURE

Alkyl aromatic hydrocarbons such as ethyl benzene are dehydrogenated to form vinyl aromatic hydrocarbons such as styrene by reaction with steam. One of the better catalysts for this dehydrogenation process is a catalyst containing $Fe_2O_3$, $K_2CO_3$, $Cr_2O_3$, and $V_2O_5$. The selectivity and yield of this catalyst are improved if the alkali metal carbonate and the vanadium oxide are dissolved in water separately before blending or mixing with the $Fe_2O_3$.

---

This invention relates to the preparation of catalysts for use in the dehydrogenation of hydrocarbons, particularly the dehydrogenation of aromatic hydrocarbons, such as ethyl benzene, to form alkenyl aromatic hydrocarbons, such as styrene.

Because of its wide use as a monomer in the production of synthetic resins styrene has achieved considerable industrial importance. It is homopolymerized or copolymerized to produce a variety of plastic materials. The increased demand for styrene and similar vinyl aromatics has led to numerous attempts to improve the dehydrogenation process by which they are prepared.

Vinyl substituted aromatic hydrocarbons such as styrene are produced commercially by catalytic dehydrogenation of alkyl aromatic hydrocarbons such as ethyl benzene. Many catalysts have been used for this dehydrogenation of alkyl aromatic compounds. However, in the process selectivity, yield and conversion do not usually go hand in hand. A great deal of work has therefore been directed toward bringing these three desiderata into greater conformity. The process is generally carried out by passing ethyl benzene and a relatively larger proportion of steam, say two to thirty mols steam per mol ethyl benzene, through a bed of a suitable catalyst at an elevated temperature. Catalysts employed in the process usually contain certain metals of Groups IV to VIII of the Periodic Table. None of the catalysts, however, has been completely satisfactory.

An especially effective ethyl benzene dehydrogenation catalyst contains vanadium oxide in combination with one or more of the oxides $Fe_2O_3$, ZnO and MgO and an alkali metal chromate or dichromate, and an alkali metal carbonate. This ethyl benzene dehydrogenation catalyst is described in U.S. 3,084,125 and is prepared by mixing a major amount, i.e. in excess of 50 weight percent, of one or more of the oxides $Fe_2O_3$, ZnO and MgO with a minor amount, less than 10 weight percent, of an alkali metal chromate or dichromate, an alkali metal carbonate or oxide, and up to 2.5 weight percent calculated as vanadium of a vanadium oxide or a vanadium compound or salt which yields a vanadium oxide at elevated temperatures and whose anions have no harmful effect on the catalyst. To these essential catalyst ingredients, it is preferred to add a minor amount, less than 10 weight percent, of porosity promoting and extruding aids such as a methyl cellulose whose 2 percent aqueous solution at room temperature has a viscosity from 2000 to 3000 centipoises, graphite, a stabilizing oxide such as $Cu_2O$ and a refractory cement resistant to elevated temperatures, for example a lumnite cement. A particularly desirable cement is steam treated calcium aluminate cement disclosed in copending application Ser. No. 44,445 filed Dec. 30, 1964, now Patent No. 3,042,278.

As pointed out in U.S. 3,084,125 dehydrogenation of ethyl benzene to styrene can be accomplished by passing a mixture of ethyl benzene and steam, advantageously about 2 weight parts of steam per part of ethyl benzene, over the catalyst at a space velocity and at a temperature sufficient to maintain conversion at an advantageous 25 to 75 percent, generally at about 50 percent. Such a conversion can be achieved with a temperature in the range of 1000° F. to 1250° F. and a space velocity of about 0.5 gram of ethyl benzene per milliliter of catalyst per hour.

In accordance with this invention a catalyst of the U.S. 3,084,125 type, a particularly desirable catalyst, is even further improved, particularly selectivity and yield at a given conversion and at higher temperatures.

In one of its aspects this invention is based on an improved method for making catalysts of the U.S. 3,084,125 type. In another aspect it has been found that MgO and ZnO of U.S. 3,084,125 are detrimental to a catalyst prepared according to this invention. The catalyst of this invention hence consists essentially of 70 to 80 percent ferric oxide, 15 to 25 percent alkali metal oxide or carbonate, 2 to 5 percent vanadium oxide, 0.3 to 5 percent, preferably 0.5 to 3 percent chromic oxide and the promoting and extending agents mentioned hereinbefore. The purpose of the potassium, sodium or rubidium carbonate, and other alkali metal salts which form the oxide on calcination, is to act as a catalyst to promote a reaction of carbon with steam, thereby preventing carbon accumulation. The function of the chromic oxide, or a salt resulting in chromic oxide on calcination, is to hold the iron in the desired valence state.

In the preparation of the catalysts disclosed in U.S. 3,084,125, the catalyst ingredients are dry blended until intimately dispersed. Water is then added in a quantity sufficient to provide a slurry or paste which can be extruded and chopped into the catalyst pellets of desired size. It has now been discovered that if magnesium and zinc oxides are omitted, and if the alkali metal carbonate, or oxide, and the vanadium compound are dissolved in water separately, before blending or mixing with the ferric oxide, the activity and yield are improved at a given conversion. Vanadium oxide is insoluble in water. However, it has been found soluble in alkaline solution. The carbonate salt provides the required alkalinity for solution of the vanadium oxide leading to an improved catalyst. Thus rather than taking the obvious route of dry mixing the ingredients as was done in U.S. 3,084,125 the extra step is taken of utilizing all or a portion of the total calculated water to first put the potassium carbonate and vanadium oxide in solution.

The improvement in yield and selectivity obtained at various conversion levels, and other advantages resulting from preparing a vanadium dehydrogenation catalyst according to this invention can best be seen from data obtained in the dehydrogenation of ethyl benzene. The dehydrogenation reactions were carried out in isothermal reactors comprising jacketed iron pipes with ¾ inch diameters. The reactions were conducted at 1000° F., to 1200° F. and at a steam to ethyl benzene ratio as set forth hereinafter, the reactor being operated under optimum conditions at each temperature.

For use in these dehydrogenation reactions, the catalyst of U.S. 3,084,125 (Catalyst A), a well known commercial catalyst used in styrene manufacture (Catalyst B), and the catalyst of this invention (Catalyst C), were prepared according to the following examples. The examples and data are for the purpose of illustration only. Obviously variations can be made. For example, rather than chromium oxide and potassium carbonate, any chromium or potassium salt can be used which upon calcination results in the oxide. Such and other variations and ramifications are deemed to be within the scope of this invention.

EXAMPLE A

A catalyst was prepared following the procedure of Example 1 of U.S. 3,084,125 using the following:

| Ingredients: | Weight percent |
|---|---|
| $Fe_2O_3$ | 29.7 |
| ZnO | 29.7 |
| $Cu_2O$ | 8.9 |
| $Na_2Cr_2O_7$ | 8.9 |
| $K_2CO_3$ | 8.9 |
| Lumnite cement | 3.9 |
| Graphite | 5.1 |
| Methocel | 4.0 |
| $V_2O_5$ | 0.9 |
| | 100.0 |

The ingredients were dry blended and the catalyst was prepared following Example 1 of U.S. 3,084,125 except that 100 grams of water, rather than 140 grams, were used.

EXAMPLE B

One of the first major catalysts used by the government during World War II for both styrene and butadiene synthesis by dehydrogenation was a 72.4% MgO; 18.4% $Fe_2O_3$; 4.6% CuO; 4.6% $K_2O$ catalyst. This led to a more selective commercially available catalyst now used almost exclusively for styrene manufacture (Catalyst B). The composition of this catalyst is as follows:

*Composition of catalyst B*

| Ingredients: | Weight percent |
|---|---|
| $Fe_2O_3$ | 87.5 |
| $K_2CO_3$ | 10.5 |
| $Cr_2O_3$ | 2.0 |

EXAMPLE C

A catalyst was prepared using the following ingredients and procedure.

| Ingredients: | Weight percent |
|---|---|
| $Fe_2O_3$ | 74.5 |
| $K_2CO_3$ | 20.0 |
| $Cr_2O_3$ | 2.0 |
| $V_2O_5$ | 3.5 |

To prepare a 500 pound batch of catalyst using the above ingredients in the ratios set forth, 372 pounds of $Fe_2O_3$, and 10 pounds of $Cr_2O_3$ were dry mixed 30 minutes in a Simpson mixer. In a separate vessel 100 pounds of $K_2CO_3$ and 17.5 pounds of $V_2O_5$ were dissolved in 74 pounds of water. This water solution was added to the dry mix and the entire formulation was mixed for an additional 30 minutes. The batch was pelleted using a California pelletizer and the catalyst pellets were dried at 325° F. for eight to ten hours. The catalyst was then calcined at 1400° F. for one half to one hour.

Table I presents a summation of data obtained in the dehydrogenation of ethyl benzene using Catalyst A, Catalyst B, and Catalyst C. Using the steam-gas ratio in the range of 10:1 to 12:1 dehydrogenation reactions were conducted at 1000° F., 1100° F., 1150° F., and 1200° F., the data obtained being as follows:

TABLE I

| Catalyst | Product Analysis (weight percent) | | | | | Yield | Conversion |
| | Temp., ° F. | Styrene | Ethyl Benz. | Toluene | Benz. | | |
|---|---|---|---|---|---|---|---|
| A | 1,000 | 13.3 | 85.7 | 0.72 | 0.36 | 91.5 | 13.3 |
| B | 1,000 | 30.3 | 68.7 | 0.64 | 0.42 | 95.5 | 30.3 |
| C | 1,000 | 41.3 | 56.5 | 1.68 | 0.56 | 93.5 | 41.3 |
| A | 1,100 | 32.9 | 65.0 | 1.39 | 0.61 | 91.6 | 32.9 |
| B | 1,100 | 60.5 | 33.2 | 4.81 | 1.52 | 88.2 | 60.5 |
| C | 1,100 | 68.4 | 29.4 | 4.91 | 1.37 | 89.2 | 68.4 |
| A | 1,150 | 49.8 | 46.3 | 2.72 | 1.24 | 88.6 | 49.8 |
| B | 1,150 | 67.0 | 23.1 | 7.57 | 2.34 | 83.2 | 67.0 |
| C | 1,150 | 72.8 | 19.8 | 5.57 | 1.91 | 86.5 | 72.8 |
| A | 1,200 | 63.2 | 29.4 | +5.32 | 2.06 | 84.3 | 63.2 |
| B | 1,200 | 72.0 | 12.1 | 12.5 | 3.43 | 77.3 | 72.0 |
| C | 1,200 | 77.8 | 11.2 | 8.56 | 2.47 | 32.3 | 77.8 |

The foregoing data as obtained are not satisfactory for the purposes of comparison since the yield, the conversion, and the selectivity (toluene plus benzene) are not equal. For the purposes of comparison it is generally desirable to discuss selectivity and yield at a given conversion, say, a 30 percent conversion, a 50 percent conversion, a 70 percent conversion, etc., that is, the conversion at which a plant must operate day after day. The following table shows yield and selectivity obtained at conversions of 30 percent, 50 percent and 70 percent for the above catalysts by interpolation.

TABLE II

| Catalyst | Conversion | Selectivity* | Yield |
|---|---|---|---|
| A | 30 | 1.8 | 92 |
| B | 30 | 1.0 | 95 |
| C | 30 | 1.05 | 95 |
| A | 50 | 4.4 | 88 |
| B | 50 | 4.0 | 90.5 |
| C | 50 | 3.0 | 93 |
| A | 70 | 8.5 | 82 |
| B | 70 | 12.8 | 80 |
| C | 70 | 6.4 | 88 |

* Sum of benzene plus toluene.

The data in Table II show that at 30 percent conversion prior art catalysts and the catalyst of this invention (Catalyst C) compare favorably. However, at 50 percent and 70 percent conversion both selectivity and yield are markedly improved by the catalyst of this invention.

According to this invention iron oxide addition is withheld until the vanadium oxide and the potassium, or other alkali metal, carbonate have been dissolved in the water, and no zinc or magnesium oxide is used. The vanadium oxide and potassium carbonate active ingredients are first dissolved in the water which is subsequently combined with the iron oxide carrier, sufficient water being employed only to form a workable paste, generally 10 to 15 percent based on total solid materials. Chromium oxide preferably is included with the $Fe_2O_3$. Under normal conditions vanadium oxide is insoluble in water, but it is soluble in an alkaline aqueous medium. The potassium carbonate renders the water sufficiently alkaline to permit solution of the vanadium oxide. Without being limited to any theory, it is believed that the solution of the vanadium oxide promotes its dispersion or diffusion throughout the catalyst mass. To illustrate this improvement a catalyst was made using the exact ingredients of Example C but without dissolving the vanadium oxide in water prior to its addition to the iron oxide dry mix.

EXAMPLE D

| Ingredients: | Weight percent |
|---|---|
| $Fe_2O_3$ | 74.5 |
| $K_2CO_3$ | 20.0 |
| $Cr_2O_3$ | 2.0 |
| $V_2O_5$ | 3.5 |

This 500 pound batch was made by dry mixing 372 pounds of $Fe_2O_3$, 100 pounds of $K_2CO_3$, 17.5 pounds of $V_2O_5$ and 10 pounds of $Cr_2O_3$ in a Simpson mixer for 30 minutes. To this dry mix 74 pounds of water were added with additional mixing for approximately 30 minutes. The catalyst was then pelletized and calcined as in Example C.

EXAMPLE E

Following the procedure of Example C catalysts were prepared having the following compositions:

| Catalyst E | | Catalyst F | |
|---|---|---|---|
| Ingredients | Wt. Percent | Ingredients | Wt. Percent |
| $Fe_2O_3$ | 82.5 | $Fe_2O_3$ | 82.5 |
| $K_2CO_3$ | 10.0 | $K_2CO_3$ | 10.0 |
| $Cr_2O_3$ | 2.5 | $Cr_2O_3$ | 2.5 |
| ZnO | 5.0 | MgO | 5.0 |

The catalysts thus made were used in the dehydrogenation of ethyl benzene using the procedure which resulted in the data in Table IV with the following results:

TABLE V

| Catalyst | Product Analysis (weight percent) | | | | | Yield | Conversion |
|---|---|---|---|---|---|---|---|
| | Temp., °F. | Styrene | Ethyl Benz. | Toluene | Benz. | | |
| E | 1,000 | 29.0 | 68.8 | 1.39 | .84 | 93.2 | 29.0 |
| F | 1,000 | 31.4 | 66.5 | 1.37 | .73 | 94.0 | 31.4 |
| C | 1,000 | 41.3 | 56.5 | 1.68 | .56 | 93.5 | 41.3 |
| E | 1,100 | 45.3 | 49.9 | 3.16 | 1.63 | 90.5 | 45.3 |
| F | 1,100 | 41.3 | 55.3 | 2.16 | 1.26 | 93.0 | 41.3 |
| C | 1,100 | 68.4 | 29.4 | 4.91 | 1.37 | 89.2 | 68.4 |
| E | 1,200 | 62.5 | 25.1 | 3.16 | 2.83 | 83.2 | 62.5 |
| F | 1,200 | 61.4 | 27.9 | 2.16 | 3.02 | 85.3 | 61.4 |
| C | 1,200 | 77.8 | 11.2 | 8.56 | 2.47 | 82.3 | 77.8 |

When used in an ethyl benzene dehydrogenation process Catalyst D gave the following results.

TABLE III

| Catalyst D | Dehydrogenation Results | | | |
|---|---|---|---|---|
| Temp., °F | 1,000 | 1,100 | 1,150 | 1,200 |
| Conversion | 32.6 | 63.9 | 68.5 | 73.9 |
| Yield | 95.7 | 90.0 | 87.2 | 84.0 |
| Selectivity | .90 | 5.44 | 6.69 | 6.94 |

For the purpose of comparison the data in Table III, by interpolation, has been put on a 30 percent, 50 percent, 70 percent conversion basis. A comparison of Catalyst D prepared by dry mixing is now made with Catalyst C prepared according to this invention.

TABLE IV

| Catalyst | Temp., °F. | Conversion | Yield | Selectivity * |
|---|---|---|---|---|
| C | 975 | 30 | 95 | 1.5 |
| D | 995 | 30 | 95 | 1.0 |
| C | 1,025 | 50 | 93 | 3.0 |
| D | 1,050 | 50 | 92 | 3.0 |
| C | 1,115 | 70 | 88 | 6.4 |
| D | 1,160 | 70 | 86 | 7.2 |

* Sum of benzene plus toluene.

From the data in Table IV it can be seen that as the conversion increases the results achieved by the process of this invention are increasingly significant, particularly at 70 percent conversions. At a conversion of 70 percent, an extremely high conversion for this dehydrogenation process, both the yield and selectivity are improved.

As indicated hereinbefore the catalysts of this invention differ from those of U.S. 3,084,125 not only in the method of preparation but in the fact that the catalysts of this invention are devoid of magnesium and zinc oxides. This is best illustrated by reference to the following example.

In order to compare the results obtained using these two catalysts with results of the catalyst of this invention yields and selectivities were obtained for conversions of 30 and 50 percent by interpolation. For the 70 percent data, however, it was necessary to extrapolate. This data is given in the following table:

TABLE VI

| Catalyst | Conversion | Selectivity | Yield |
|---|---|---|---|
| E | 30 | 2.5 | 93.2 |
| F | 30 | 9 | 92 |
| C | 30 | 1.05 | 95 |
| E | 50 | 6.5 | 88.5 |
| F | 50 | 5.2 | 90 |
| C | 50 | 3.0 | 93 |
| E | 70 | 18 | 79 |
| F | 70 | 12.6 | 80 |
| C | 70 | 6.4 | 88 |

The data in Table VI show that both yield and selectivity are improved according to this invention by the omission of zinc and magnesium oxides.

In view of the vast quantities of styrene produced, for example an annual production of 220,000,000 pounds per year, an increase of an even 1 percent in styrene production in this field is significant indeed. This 1 percent styrene increase based on such an annual production represents an annual increase of 2,200,000 pounds of styrene. It should be understood also that the improvement of 1 percent at 50 percent conversion and 2 percent yield at 70 percent conversions are obtained with the same catalysts, the only difference being the process by which the catalyst is made. Reference to Table II shows that when prior art catalysts are employed the differences in yield and selectivity at the various conversion levels are even more striking. Hence, according to the practice of this invention a process and catalyst have been provided which permit dehydrogenation of benzene to styrene at high conversion levels with accompanying yield and selectivity not heretofore obtainable with dehydrogenation catalysts.

What is claimed is:

1. A process for preparing an aqueous catalyst paste of 70 to 80 percent by weight $Fe_2O_3$, 15 to 25 percent by weight of an alkali metal salt heat decomposable to the oxide, 0.3 to 5 percent as $Cr_2O_3$, of one of $Cr_2O_3$ and a salt decomposable to $Cr_2O_3$, and 2 to 5 percent $V_2O_5$ which comprises dissolving $V_2O_5$ and the alkali metal salt in water, and thereafter adding the chromium salt, and $Fe_2O_3$ to the aqueous solution, the quantity of each compound added being that which is required to prepare a catalyst having the foregoing composition.

2. The process of claim 1 wherein $Fe_2O_3$ and $Cr_2O_3$ are dry blended, wherein the alkali is $K_2CO_3$, and wherein the quantity of each compound added is that which is required to prepare a catalyst having the following composition: 74.5 weight percent $Fe_2O_3$; 20.0 percent $K_2CO_3$; 2.0 percent $Cr_2O_3$; and 3.5 percent $V_2O_5$.

References Cited

UNITED STATES PATENTS

| | | | |
|---|---|---|---|
| 2,457,719 | 12/1948 | Pine et al. | 260—669 X |
| 2,666,086 | 1/1954 | Pitzer | 260—680 |
| 2,870,228 | 1/1959 | Armstrong et al. | 260—669 |
| 3,084,125 | 4/1963 | Soderquist et al. | 260—669 X |

DELBERT E. GANTZ, *Primary Examiner.*

PAUL M. COUGHLAN, JR., *Examiner.*

C. R. DAVIS, *Assistant Examiner.*

UNITED STATES PATENT OFFICE

CERTIFICATE OF CORRECTION

Patent No. 3,361,683  January 2, 1968

William R. Gutmann

It is hereby certified that error appears in the above numbered patent requiring correction and that the said Letters Patent should read as corrected below.

Column 2, lines 1 and 2, for "Ser. No. 44,445 filed Dec. 30, 1964, now Patent No. 3,042,278" read -- Ser. No. 422,445 filed Dec. 30, 1964 --; column 4, TABLE I, fifth column, line 10 thereof, for "+5.32" read -- 5.32 --; same table, seventh column, line 12 thereof, for "32.3" read -- 82.3 --.

Signed and sealed this 18th day of February 1969.

(SEAL)
Attest:

Edward M. Fletcher, Jr.
Attesting Officer

EDWARD J. BRENNER
Commissioner of Patents